US00RE37399B1

(19) United States
(12) Reissued Patent
McDonald et al.

(10) Patent Number: US RE37,399 E
(45) Date of Reissued Patent: Oct. 2, 2001

(54) SHELLFISH PROCESSING METHOD

(75) Inventors: Alister John McDonald, Golden Bay; Neil David Wilson, Nelson, both of (NZ)

(73) Assignee: Westhaven Shellfish Limited, Nelson (NZ)

(21) Appl. No.: 09/506,546

(22) Filed: Feb. 17, 2000

Related U.S. Patent Documents

Reissue of:
(64) Patent No.: 5,718,623
Issued: Feb. 17, 1998
Appl. No.: 08/640,231
Filed: Apr. 30, 1996

(30) Foreign Application Priority Data

Mar. 7, 1996 (NZ) ..... 286133

(51) Int. Cl.[7] ..... A22C 25/00; A23L 1/176; A23B 4/10

(52) U.S. Cl. ..... 452/1; 426/96

(58) Field of Search ..... 452/1, 96, 198; 426/96, 2, 272, 441

(56) References Cited

U.S. PATENT DOCUMENTS 4,163,064 * 7/1979 Hill ..... 426/2
4,788,072 * 11/1988 Kawamura ..... 426/441
5,510,133 * 4/1996 Yamamoto ..... 426/272

* cited by examiner

*Primary Examiner*—Willis Little
(74) *Attorney, Agent, or Firm*—Nath & Associates PLLC; Gary M. Nath; Jerald L. Meyer

(57) ABSTRACT

A method of processing shellfish and product thereof which reduces the susceptability of shellfish or mollusc shells to fracturing and cracking during freezing and subsequent frozen storage and transport. The method comprises blow-drying the shellfish by means of heated, unheated or dehydrated air; applying an edible oil to the shellfish; draining the oiled product; and freezing the shellfish.

13 Claims, No Drawings

SHELLFISH PROCESSING METHOD

Matter enclosed in heavy brackets [ ] appears in the original patent but forms no part of this reissue specification; matter printed in italics indicates the additions made by reissue.

The present invention relates to a method of processing shellfish and the product thereof.

More particularly, but not exclusively, the invention relates to a method of processing, freezing and cold storage of shellfish intended to mitigate the effects of ice formation during the freezing of the shellfish product.

The present invention relates to a processing method which reduces the susceptibility of shellfish or mollusc shells to fracturing and cracking during freezing and subsequent frozen storage and transport.

It is well known in the art to freeze various food substances prior to packaging, shipping and/or storage. There have been numerous techniques developed in the frozen food industry related to freezing and preservation of products such as vegetables and meats.

Such freezing and processing methods are primarily intended to preserve the food product during shipping and/or storing. To this end, general freezing techniques are well suited and relatively successful in meeting this objective.

However, many foodstuff's cosmetic appearance is adversely effected by the freezing process. Commonly, small vegetable articles can clump together and the food product may also undergo destructive freezing due to the presence of water or moisture in, not only the material part of the product, but also in the interstitial cavities and spaces present within many foodstuffs.

Such effects result in deterioration in the perceived quality as well as the appearance of the product. The presence of excess water also increases the energy which is required to freeze the product properly. This effect is particularly problematic in the context of processing vegetable products.

A number of techniques known in the art are devoted to freeze drying or similar techniques, whereby the amount of water in the product is reduced as much as practicable.

The process of freezing and cold storage of shellfish products is particularly susceptible to the abovementioned problems as any moisture present on the surface of, for example a clam, will penetrate into the porous surface of the shell and, upon freezing, expand thereby causing the shell to crack.

The useful product derived from the shellfish is the meat contained within the shells or shell. However, certain consumer markets require that the shellfish meat be served or made available still attached, or at least contained within, the original shell. Cracked, chipped or broken shells will adversely effect the presentation and appearance of the shellfish product thus reducing its appeal to the consumer. Shellfish presented in their 'natural' condition increases their satisfaction in relation to the freshness and origin of the product. Thus it can be seen that the quality and appearance of the shellfish, as a whole, is vital to the successful marketing of the product.

Also, it is desirable that the shell(s) remain intact during the processing and packaging of the shellfish prior to preparation and eating. The shells contain the flesh in the interior of the shellfish so that the molluscs may be boiled, steamed or otherwise cooked whole. In cases where the shells are cracked or otherwise damaged, the meat product contained therein can escape or be unevenly cooked by direct contact with the cooking medium.

In summary, it is vital that the shellfish be processed, frozen and stored in a condition which preserves their appearance and structural integrity. Otherwise there is significant reduction in the value of the shellfish in the market place.

It is known that the surface of a shellfish shell is relatively porous and incorporates many fine interstitial cracks, crevices and cavities which will generally contain residual water.

During harvesting, the shellfish are collected and washed thereby allowing fresh water to permeate into such crevices and cracks. In the subsequent freezing step, expansion or freezing of the residual water and the structure and number of ice crystals is such that the shells often fracture at relatively low temperatures.

Accordingly, it is an object of the present invention to provide a method which obviates the disadvantages which are inherent in the freezing and cold storage of shellfish, or to at least provide the public with a useful choice.

The present invention provides for a method of treating shellfish comprising:

the shellfish are blow dried by means of heated, unheated or dehydrated air;

applying an edible oil to the shellfish;

draining the oiled product; and freezing the shellfish.

Preferably the initial drying step is followed by a dehydrating step wherein the shellfish are placed in a dehydrating cabinet for drying, preferably for between one and twenty hours at between 10° and 28° C.

Preferably the oil is heated, boiling, or pre-warmed to up to 30° C.

Preferably the shellfish are chilled during the draining step wherein the draining step occurs for up to 24 hours.

Preferably the shellfish are blow dried at a temperature of 20° C. or less.

Preferably the edible oil is a vegetable, animal synthetic or mineral oil.

The method of treating shellfish may further comprise:

vacuum sealing the oiled product in a vacuum bag;

cooking the vacuum bagged product in an immersion type cooker or similar, preferably cooking from 4 to 5 minutes at a immersion medium temperature of 80° to 90° C.;

cooling the cooked product in an ice slurry or similar for up to 30 minutes; and blast freezing the bagged product to substantially −18° C.

The abovementioned process may be applied to univalve and bivalve shellfish and similar molluscs.

A particular embodiment of the invention will now be described, by way of example only.

The shellfish are usually harvested from the sea, washed in fresh water, dried and washed again. The shellfish are dried by blowing large volumes of air at approximately 10° C. or less across or through the product. Alternatively, the air may be unheated or dehydrated.

This step corresponds to a pre-drying step which immediately follows washing and grading the shellfish once they have been harvested from the ocean. It is to be understood that the washing and drying process is not limited to a single cycle.

The shellfish are further dried by means of dehydrating cabinets in order to remove substantially all of the moisture from the shell exterior. This secondary drying step is performed for 1 to 20 hours at a temperature of 10°–28° C.

The shellfish are then removed from the dehydrating cabinets and immediately immersed in vegetable oil. The vegetable oil may be pre-warmed to up to 30° C. It is envisaged that the oil used to coat the shellfish may be derived from an vegetable or animal. However, some synthetic or mineral oils may be appropriate and the inclusion of these is contemplated to be within the scope of the present invention. The present example is discussed with reference to vegetable oil as this has been shown to be particularly suitable for use in the present process.

The oiled product is held in a chiller for draining or further processing. The chiller is cooled to a temperature specified by food processing regulations relevant to the art. Draining may be performed for up to 24 hours.

The desired quantity of the oiled shellfish product is placed in a vacuum bag which is then vacuum sealed. Such sealing processes are considered to be within the purview of one skilled in the art and will not be discussed any further.

The vacuum bagged product is then processed in an immersion or similar cooking means. The cooking step may take from four to five minutes and, in the case of a water immersion cooker, the temperature in the cooker may be between 80° to 99° C.

Following cooking, the hot bags of shellfish product are placed in a running ice slurry or similar to accelerate cooling. This cooling step may be performed for up to 30 minutes.

The shellfish product is then blast frozen to −18° C. following which the bag product is packaged further into units suitable for transport or holding in a freezer awaiting downstream packaging. The cooking step may constitute pasteurisation.

Without being bound by any theory, it is understood that the oil coating described above acts as an agent which, upon freezing, reduces its volume as well as displaces the water from the interstitial cavities and cracks in the shellfish shell. This reduces the susceptibility of the shellfish to cracking upon freezing and cold storage.

The abovementioned process and coating technique has been applied to cockles (otherwise known as clams). However, it is envisaged that similar techniques may be applied to other shellfish.

It is to understood that the scope of the invention is not limited to the described embodiment and therefore that numerous variations and modifications may be made to the invention without departing from the scope of spirit of the appended claims.

What we claim is:

1. A method of treating shellfish comprising:

blow drying the shellfish;

applying an edible oil to the shellfish;

draining the oiled product; and freezing the shellfish.

2. A method as claimed in claim 1 wherein the initial blow drying step is followed by a dehydrating step wherein the shellfish are placed in a dehydrating cabinet for drying, preferably for between one and twenty hours at between 10° and 28° C.

3. A method as claimed in claim 1 wherein the oil is heated, boiled or more preferably pre-warmed to up to 30° C.

4. A method as claimed in claim 1 wherein the shellfish are chilled during the draining step wherein the draining step occurs for up to 24 hours.

5. A method as claimed in claim 1 wherein the shellfish are blow dried at a temperature of 20° C. or less.

6. A method as claimed in claim 1 wherein the edible oil is a vegetable, animal synthetic or mineral oil.

7. A method as claimed in claim 1 further comprising:

vacuum sealing the oiled product in a vacuum bag;

cooking the vacuum bagged product in an immersion type cooker or similar, preferably cooking from 4 to 5 minutes at an immersion medium temperature of 80° to 90° C.;

cooling the cooked product in an ice slurry or similar for up to 30 minutes; and blast freezing the bagged product to substantially −18° C.

8. A method as claimed in claim 1 applied to univalve and bivalve shellfish and similar molluscs.

9. Shellfish treated according to claim 1.

10. A method of treating shellfish as claimed in claim 1 substantially as described herein.

11. A method as claimed in claim 1, wherein said blow drying is effected using heated air.

12. A method as claimed in claim 1, wherein said blow drying is effected using unheated air.

13. A method as claimed in claim 1, wherein said blow drying is effected using dehydrated air.

* * * * *